Dec. 23, 1969  M. J. EVANS  3,485,458
WIRE PULLER
Filed July 5, 1968
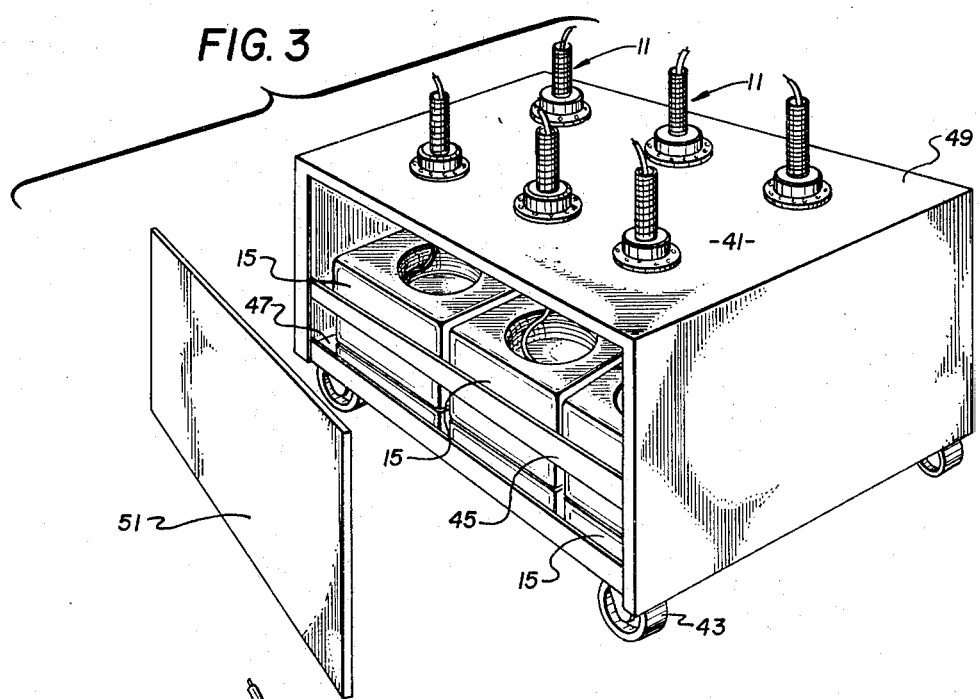
FIG. 3
FIG. 1
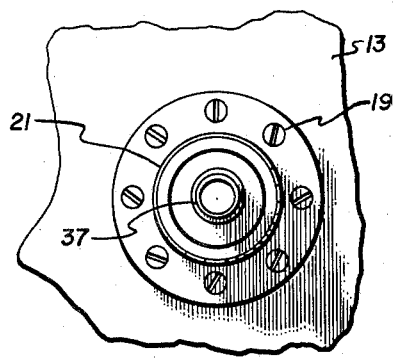
FIG. 2
INVENTOR.
MARTIN J. EVANS
BY
SOKOLSKI & WOHLGEMUTH
ATTORNEYS

United States Patent Office 3,485,458
Patented Dec. 23, 1969

3,485,458
WIRE PULLER
Martin J. Evans, 22143 Califa, Woodland
Hills, Calif. 91364
Filed July 5, 1968, Ser. No. 742,597
Int. Cl. B65h 49/16
U.S. Cl. 242—129                                    8 Claims

ABSTRACT OF THE DISCLOSURE

A device for pulling electric wires from coils thereof for mounting on a flat plate or surface above the coil, having a collar for fixation to the surface, a freely rotating sleeve supported by a bearing in the collar, with a readily flexible conduit extending from the side of the sleeve directed toward the wire coil, and a separate tightly coiled spring extending from the other end of the sleeve. A plurality of such devices can be used in conjunction with a mobile container for several coils of wire.

---

In the construction of commercial buildings particularly, electricans require several different colors of electrical wire, as well as different sizes. Presently, the electrician hand carries the box or carton containing each coil of wire used, from place to place as he utilizes the material. Since the wires are hand carried, often several trips are required to bring the wires from one location in a building to another, or even from one side of a large room to the other. This is, of course, time consuming and increases the overall cost of an electrical installation. If a box is dropped and broken, the coiled wire therein can become unravelled, further complicating the installation process.

The electrical wire is normally coiled within a box having an aperture through which the wire protrudes and is pulled therefrom. If the wire is pulled at an angle relative to the box rather than from the center of the aperture, it is often difficult to easily withdraw. In fact, the box would tend to slide on the floor and the wire would not be readily pulled off the coil unless the box is held with one hand or a foot. As a result, the time and effort in positioning the container or box for the wire during the pulling operation is further overly consuming and complicates the overall installation process.

Thus, it can be seen that there are two major problems in handling electrical wire, the first being the mobility of several different types and/or colors of wire from place to place within a construction zone, and secondly, the ease of withdrawing the wire coiled within the box containing it.

Prior to the herein invention, devices had been disclosed somewhat similar to that herein shown. These devices for withdrawing wire from spools and coils or thread from spools, for example, involved the use of a single spring element rigidly held at its midportion allowing each half or portion to rotate independent from the other so that the wire or the like passing through the spring could be directed to the user through one half, while the other half would follow the spool or coil as it unravelled. Other devices using this principle included a rigid tube having a spring affixed to each end, where the wire or thread would be conducted a considerable length from the coil. However, none of these devices have found practical utilization in the field of electrical wire pulling, since due to the relatively heavy and stiff electrical wire they were not completely satisfactory for easily withdrawing the same from a coil.

Briefly, the herein invention comprises a collar which is to be mounted on a plate spatially disposed above the coil of wire to be unwound. The collar is preferably located along the line with the center axis of the coil. Extending through the plate and concentrically within the collar is a hollow sleeve which is supported by bearings to turn freely within the collar. Affixed to the sleeve at one end and extending toward the coil is a hollow flexible tube which can be made, for example, of material such as flexible electrical conduit. Extending from the other end of the sleeve is a flexible tubular member which is considerably stiffer than the one extending toward the coil. This second tubular flexible member can be comprised of, for example, a relatively stiff spring.

The wire is threaded through the two tubular members and the center sleeve. The bottom very flexible tubular member extending toward the coil will follow the coil as it unwinds, while the sleeve remains relatively fixed. The sleeve alternatively will rotate as one rotates the unwound wire from position to position pulling on the bent stiff spring upper member. A plurality of such units are preferably used on a movable housing containing a plurality of coils of wire. It is believed the invention will be better understood from the following detailed description and drawings in which:

FIG. 1 is a partially sectioned pictorial view of a device of this invention;

FIG. 2 is a top view taken along lines 2—2 of FIG. 1; and

FIG. 3 is a pictorial representation of a preferred embodiment of the invention where a plurality of the devices are utilized.

Turning to FIGS. 1 and 2, there is seen the device 11 of this invention mounted on a suitable plate 13. The plate 13 is disposed above a box 15 containing a coiled wire 17. Mounted by bolts 19 on top of plate 13 is a collar 21. Collar 21 is situated over an aperture 23 in plate 13. Aperture 23 is preferably aligned with the center axis X—X of the coil of wire contained in the box 15.

A rotatable sleeve 25 extends through collar 21 and aperture 23. The sleeve 25 is supported in the collar 21 by ball bearings 27, allowing it to turn freely relative to the collar. A threaded stud 29 is partially secured to the end of sleeve 25 directed toward box 15. Stud 29 serves to secure a flexible tube 31 to the sleeve 25. The tubular member 31 should not be too rigid so that it can easily follow, as shown in the dotted line, the circumference of the coil as the wire 17 unwinds. Typical electrical flex conduit is quite satisfactory for the type of tubular member that is required at 31 to accomplish the foregoing purpose. A plastic cap 33 or the like can be secured to the end of the tube 31 to prevent its sharp edges from cutting the wire 17 as it is pulled off of the coil.

Affixed to the upper end of the sleeve 25 on the threaded stud 35 is a stiff flexible tube 37. Tube 37 unlike 31 is considerably more rigid and can be made as shown from a spring. The tube 37 should not be so stiff that it could not be readily bent to the dotted positions shown without too much effort. However, it should be stiff enough so that it can and will remain in an erect and upright position so that the wire when desired can be pulled straight upward through the device. Often wire will be pulled in a straight upward position, especially when the device is at ground level and wire is being pulled to an upper point in a room. Thus, it is necessary that the portion of the device above plate 15 remain relatively erect so as not to interfere with the movement of the wire in the vertical direction. As a result, element 37 must return to a perfectly vertical position when not forced to bend in a direction toward plate 13. Additionally, due to its stiff springiness, when wire is being pulled at an angle, the element will not make too severe a bend, but rather a smooth curve as shown in the dotted position. Further, the stiffness of the element 37 tends to take any remaining curvature out of the wire when the wire is pulled through it.

This facilitates the eventual threading of the wire in the conduit.

The aforegoing advantages do not apply to the flexible member 31, which will not necessarily return to a perfectly vertical position after continuous use in unwinding a coil. Of course, in the downward coil following movement of tubular element 31, it is not at all important that it have the stiff upright properties of element 37. In fact, as indicated, it should be more flexible than 37 to achieve a good following motion for wire 17.

It should be further appreciated that the bearing 27 provides an important function in that it allows an easy turning of the relatively stiff spring member 37 by the electrician as he is pulling the wire at various angles relative to the device 41. When the upper spring element 37 is bent at any angle relative to the top surface 49 of the container 41, the bottom or lower element 31 will rotate to follow the coil without the bearing having any effect. In other words, the collar 25 remains in a static position, held there by the force of the wire on the spring element 37.

It should be pointed out that in lieu of a flexible conduit, tubular element 31 can be comprised of a lighter duty spring. Such a spring, however, would generally not be suitable for the upper tubular element 37, since through repeated flexure to the dotted positions the spring would not tend to return to a perfectly vertical upright position that is required for the reasons indicated above. Thus, a relatively stiffer spring is still needed for the upper element 37.

In FIG. 3, there is seen a mobile housing or box 41 mounted on casters 43. Within container 41 is a shelf 45 on which are disposed boxes 15 containing coils of electrical wire. Additional boxes 15 are stored below shelf 45 resting on the bottom 47 of the container 41. As shown in this particular example, six boxes are located on the shelf 45. Mounted on the top surface 49 of the container 41 are six of the devices 11 of the invention, with each such device co-aligned with the center axis of the corresponding box of wire 15 underneath on shelf 45. For most practical purposes, a selection of six different wires is satisfactory. The additional boxes stored on the bottom 47 of the container 41 serve to give even a greater selection when required. The container 41 preferably has a removable panel 51 on each side thereof, so that ready access can be had to the coils of wire. As can now be appreciated, the container 41 can be rolled to a desired spot in a building under construction and an electrician or electricians utilizing it can draw wire from the relatively central location within a room that is being wired.

I claim:
1. A device to facilitate pulling wire from a coil thereof comprising:
   a rotatable sleeve,
   a first flexible tube affixed to one end of said sleeve,
   a second flexible tube affixed to the other end of said sleeve.
2. The device of claim 1 wherein said sleeve is surrounded by a collar.
3. The device of claim 1 wherein one flexible tube has greater flexibility than the other.
4. The device of claim 3 wherein the tube with the lesser flexibility comprises a stiff spring member.
5. In combination:
   means for supporting at least one coil of wire below a top surface,
   means disposed in said top surface for facilitating removal of wire from a coil, said means comprising:
      a rotatable sleeve extending through said top surface,
      a first flexible tube affixed to one end of said sleeve extending toward said support means,
      and a second flexible tube affixed to the other end of said collar.
6. The combination of claim 5 wherein said first flexible tube has greater flexibility than said second tube.
7. The combination of claim 6 wherein said second flexible tube is a stiff spring member.
8. The combination of claim 5 wherein said support means comprises:
   a movable housing having a top plate surface,
   a shelf disposed in said housing below said top surface for containing said coils of wire,
   and one of said means disposed in said top surface for each coil of wire to be supported on said shelf.

References Cited

UNITED STATES PATENTS

| | | | |
|---|---|---|---|
| 444,866 | 1/1891 | Werner | 242—129.53 |
| 2,828,928 | 4/1958 | Kollisch | 242—137.1 |
| 3,058,689 | 10/1962 | Luth | 242—128 |
| 3,172,617 | 3/1965 | Johnson | 242—129.5 |

FOREIGN PATENTS

| | | |
|---|---|---|
| 704,060 | 8/1936 | Germany. |
| 546,893 | 7/1941 | Great Britain. |

LEONARD D. CHRISTIAN, Primary Examiner

U.S. Cl. X.R.

242—129.53, 129.62, 129.72, 157